(12) United States Patent
Juhola

(10) Patent No.: US 10,156,665 B2
(45) Date of Patent: Dec. 18, 2018

(54) INFRARED CUT-OFF FILTER

(71) Applicant: Microsoft Technology Licensing, LLC, Redmond, WA (US)

(72) Inventor: Mikko Juhola, Muurla (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 152 days.

(21) Appl. No.: 15/170,849

(22) Filed: Jun. 1, 2016

(65) Prior Publication Data

US 2017/0351016 A1 Dec. 7, 2017

(51) Int. Cl.

| | |
|---|---|
| G02B 5/28 | (2006.01) |
| G02B 1/11 | (2015.01) |
| H04N 5/374 | (2011.01) |
| H04N 5/225 | (2006.01) |
| H04N 5/33 | (2006.01) |
| H04N 5/232 | (2006.01) |
| H04N 9/04 | (2006.01) |

(52) U.S. Cl.
CPC ............ G02B 5/281 (2013.01); G02B 1/11 (2013.01); H04N 5/2254 (2013.01); H04N 5/23248 (2013.01); H04N 5/33 (2013.01); H04N 5/374 (2013.01); H04N 9/045 (2013.01)

(58) Field of Classification Search
CPC ........ G02B 13/001; G02B 1/11; G02B 5/281; H04N 5/2254; H04N 5/23248; H04N 5/33; H04N 5/374; H04N 9/045
See application file for complete search history.

(56) References Cited

U.S. PATENT DOCUMENTS

| | | | |
|---|---|---|---|
| 8,693,089 B2 | 4/2014 | Saitoh et al. | |
| 9,623,799 B2 * | 4/2017 | Bingle | B60R 1/02 |
| 2002/0003571 A1* | 1/2002 | Schofield | B60C 23/00 |
| | | | 348/148 |
| 2005/0001912 A1* | 1/2005 | Hoshuyama | H04N 9/045 |
| | | | 348/272 |
| 2005/0162757 A1* | 7/2005 | Ning | G02B 13/0035 |
| | | | 359/784 |
| 2005/0258349 A1* | 11/2005 | Matsuyama | G01J 1/04 |
| | | | 250/226 |
| 2006/0092285 A1* | 5/2006 | Shin | H04N 5/2253 |
| | | | 348/208.7 |
| 2010/0118150 A1* | 5/2010 | Boland | H04N 5/2259 |
| | | | 348/207.1 |

(Continued)

FOREIGN PATENT DOCUMENTS

| | | |
|---|---|---|
| CN | 201133995 Y | 10/2008 |
| CN | 202886635 U | 4/2013 |

OTHER PUBLICATIONS

"Precision Infrared Narrow Bandpass and Dual Bandpass Filters Featuring Low OH-Band Absorption", Published on: Jun. 2013, 7 pages, Available at: http://www.alluxa.com/learning-center/item/43-Precision-Infrared-Narrow-Bandpass-and-Dual-Bandpass-Filters-Featuring-Low-OH-Band-Absorption.

Rahmlow, et al., "Filters for Dual Band Infrared Imagers", In Proceedings of SPIE, International Society for Optics and Photonics, vol. 7298, May 6, 2009, 8 pages.

"Dual Bandpass Filters", Retrieved on: Feb. 12, 2016, 8 pages, Available at: http://midopt.com/dual-bandpass/.

(Continued)

*Primary Examiner* — Anner N Holder

(57) ABSTRACT

According to an embodiment a device comprises: an image sensor, an optical system comprising at least one lens, and an infrared, IR cut-off filter, transmission characteristics of the IR cut-off filter comprising a ripple with low transmission between wavelengths corresponding to blue and green.

20 Claims, 6 Drawing Sheets

(56) References Cited

U.S. PATENT DOCUMENTS

| | | | |
|---|---|---|---|
| 2010/0188532 A1* | 7/2010 | Kusaka | H04N 5/23212 348/240.99 |
| 2010/0243899 A1* | 9/2010 | Ovsiannikov | G03B 13/02 250/339.02 |
| 2010/0289885 A1* | 11/2010 | Lu | H04N 5/2258 348/61 |
| 2011/0228399 A1* | 9/2011 | Ohnishi | G02B 5/281 359/586 |
| 2013/0021515 A1* | 1/2013 | Wang | G02B 5/282 348/342 |
| 2014/0300749 A1* | 10/2014 | Seo | H04N 5/23212 348/164 |
| 2015/0092085 A1* | 4/2015 | Nakade | G06T 5/002 348/240.3 |
| 2015/0260888 A1* | 9/2015 | Yoshihara | G02B 5/26 359/359 |
| 2015/0372037 A1* | 12/2015 | Tomeba | H01L 27/14618 257/432 |
| 2016/0011348 A1* | 1/2016 | Hirakoso | G02B 5/206 359/359 |
| 2016/0141258 A1* | 5/2016 | Jain | B32B 27/00 257/787 |
| 2017/0142312 A1* | 5/2017 | Dal Mutto | H04N 13/0239 |
| 2017/0251143 A1* | 8/2017 | Peruch | G06T 17/00 |

OTHER PUBLICATIONS

Ni, et al., "Infrared tunable dual-band polarization filter based on compound asymmetrical cross-shaped resonator", In Proceedings of International Conference on Numerical Simulation of Optoelectronic Devices, Sep. 7, 2015, pp. 43-44.

Sun, et al., "Design and analysis of a multi-element dual band infrared detector for counter-countermeasure", In Journal of SPIE Optical Engineering, vol. 53, Issue 1, Mar. 1, 2014, 1 page.

Feng, et al., "Dual-band infrared perfect absorber based on asymmetric T-shaped plasmonic array", In Journal of Optics Express, vol. 22, Issue S2, Feb. 13, 2014, 9 pages.

Cohen, et al., "Dual- and Triple-Band AR Coatings Enhance IR Systems", Published on: Aug. 4, 2014, 7 pages, Available at: http://www.photonics.com/Article.aspx?AID=55204.

Liang, et al., "Design and fabricating of visible/infrared dual-band microfilter array", In Proceedings of SPIE, vol. 7135, Nov. 25, 2009, 9 pages.

Lin, et al., "Dual-Bandpass Filters With Serial Configuration Using LTCC Technology", In Proceedings of IEEE Transactions on Microwave Theory and techniques, vol. 56, Issue 6, Jun. 2006, pp. 2321-2328.

"Dual Band IR Calibration", Retrieved on: Feb. 12, 2016, 2 pages, Available at: https://aptina.atlassian.net/wiki/display/DEVS/Dual+Band+IR+Calibration.

\* cited by examiner

INFRARED CUT-OFF FILTER

BACKGROUND

Cameras are an essential component of modern mobile devices like smartphones, tablets etc. In some devices, more than one camera module may be incorporated. Portable electronic devices are usually small in size and their components are designed to be as small as possible. A camera of such a device may have a small image sensor. An image sensor, for example a Complementary Metal oxide Semiconductor, CMOS sensor may be sensitive to radiation having wavelengths other than those the human eye can see. As such filters are employed to prevent unwanted wavelengths from entering the image sensor. Infrared, IR cut off filters also called IR cut filters or heat-absorbing filters, are used to prevent infrared light from entering the image sensor. Such filters have a passband, for example, between 400 nm to 670 nm, and a stop band for higher wavelengths, for example from 700 nm up. This enables an image sensor to only receive wavelengths visible to human eye and consequently be able to reproduce colors somewhat accurately.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A device is described. In an embodiment, a device comprises: an image sensor, an optical system comprising at least one lens, and an infrared, IR cut-off filter, the transmission characteristics of the IR cut-off filter comprising a ripple with low transmission between wavelengths corresponding to blue and green.

In other embodiments, a device and a method are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of portable devices comprising a camera, for example, mobile phones, phablets, tablets, laptops, digital cameras, media playback devices etc.

The terms Infrared cut-off filter, IR cut-off filter, Infrared cut filter, IR cut filter, Infrared filter, IR filter, may be used interchangeably. According to an embodiment, IR cut-off filters are intended to include optical filters which have a stop band corresponding to infrared wavelengths, but have at least one pass band in the visible wavelength region.

Figure 1:
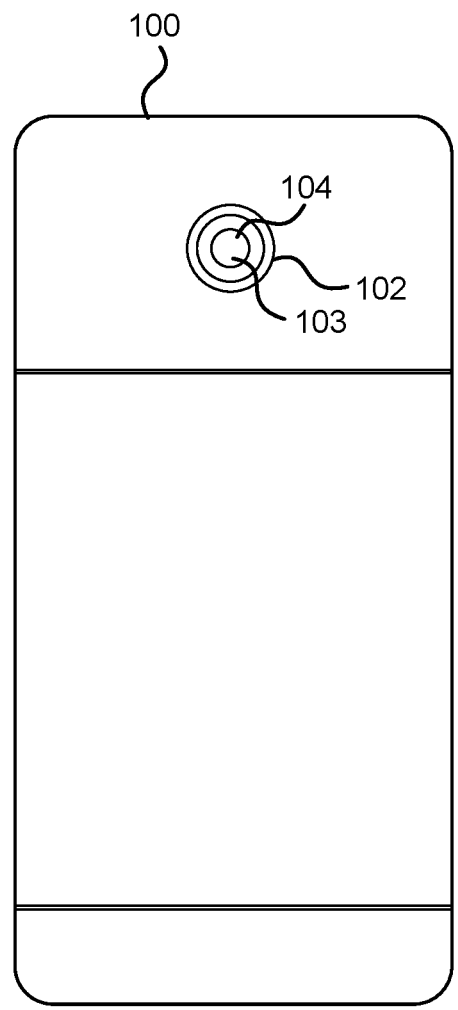
FIG. 1 illustrates a schematic representation of a device comprising a camera according to an embodiment.

FIG. 1 illustrates a device 100 according to an embodiment. The device 100 may comprise a camera 102, having optical access to outside the device 100 via an aperture 103. The camera 102 may comprise an optical system 104. Further the camera 102 may comprise an IR cut filter (not shown in FIG. 1), and an image sensor (not shown in FIG. 1). The device 100 may have other components like a memory, a processor (not shown in FIG. 1), etc.

Figure 2:
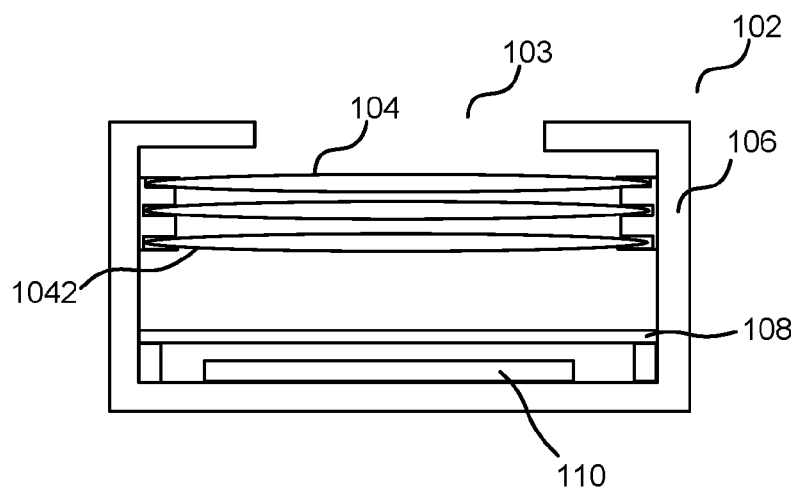
FIG. 2 illustrates a schematic representation of a camera module comprising an Infrared, IR cut-off filter according to an embodiment.

FIG. 2 illustrates a cross section of a side view of the camera 102 of the device 100 according to an embodiment. It comprises an enclosure 106 which has an aperture 103 towards the outside which extends through a device cover, an optical system 104, an IR cut filter 108, and an image sensor 110. According to an embodiment, the optical system 104 may comprise individual lenses 1042 configured to focus light incident on the aperture 103 onto image sensor 110, through the IR cut filter 108. According to an embodiment, the optical system 102 may further comprise an image stabilization system (not shown in FIG. 2). The image stabilization system may ameliorate effects of moving the device 100, for example due to user's hand shaking, during image capture. The IR cut filter 108 blocks wavelengths corresponding to infrared and allows only visible light to pass through. The sensor 110 captures the radiation coming through the IR filter 108 to capture images. Sensor 110 is designed to correspond to a standard red green blue, sRGB color space sensor. Sensor 110 comprises multiple pixels designed to capture radiation corresponding to red, green and blue colors. Each point of a scene or a frame is thus recorded as a combination of red, green and blue color information. Typical camera sensors may not correspond to an ideal sRGB response, because of, among other design constraints, the small size. This may result in non-accurate color reproduction. The IR filter 108 is configured to have a ripple in between wavelengths corresponding to green and blue. This prevents some of the light corresponding to color green from reaching the image sensor 110. Consequently, the radiation received by and the response of sensor 110 is closer to sRGB. According to an embodiment, IR filter 108 may comprise up to 30 layers of IR interference material, on the side facing the optical system 104. According to an embodiment, the IR filter 108 may comprise at least five layers of anti-reflection, AR coating on the side facing the image sensor 110. According to an embodiment, this may result in a simpler IR filter 108. According to an embodiment, IR filter 108 may be cheaper to manufacture. According to an embodiment, enclosure 106 may comprise material which has anti reflective properties. According to an embodiment, enclosure 106 may be painted black. According to an embodiment, the distances and relative orientations between image sensor 110, IF filter 108, and optical system 106 may depend upon characteristics of one or more of the image sensor, the IR cut filter or the optical system. The orientations and distances may further depend upon desired camera characteristics among other design factors. The functioning of the device 100 itself may also be improved due to the improved camera 102.

Figure 3:
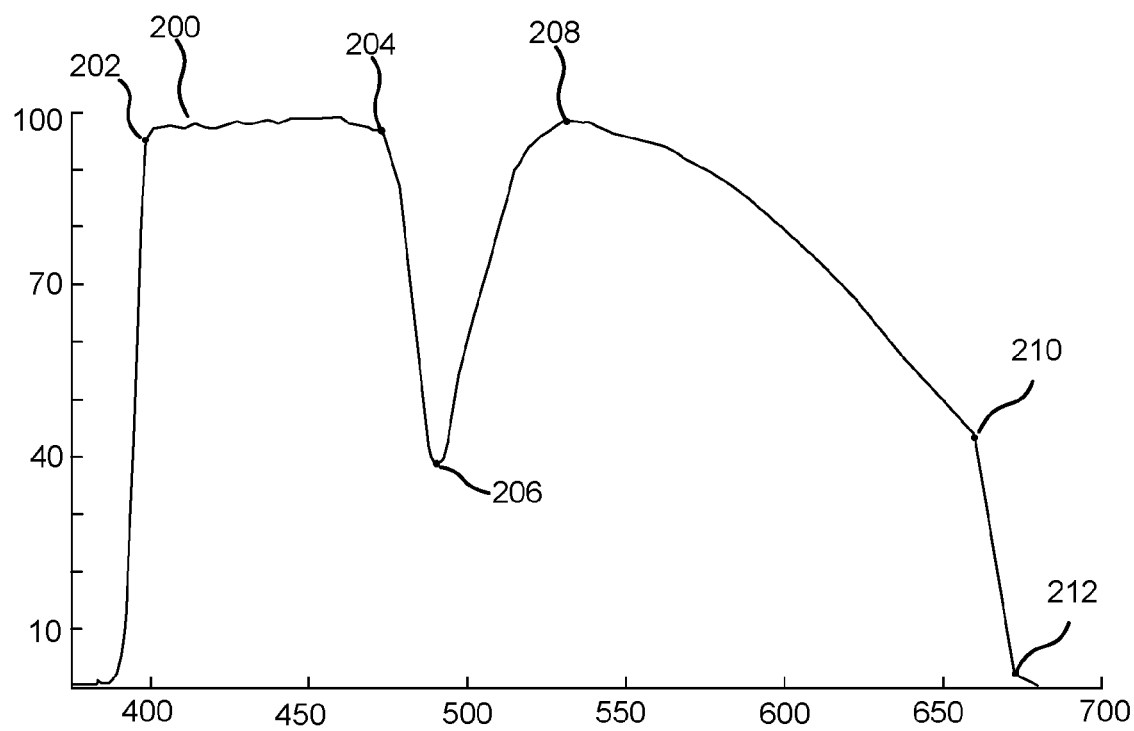
FIG. 3 illustrates a graphical representation of transmission characteristics of an IR cut-off filter according to an embodiment.

FIG. 3 illustrates, in a graphical form, the transmission characteristics of IR filter 108, according to an embodiment. The vertical axis represents transmission in percent, while horizontal axis represents wavelength of the light. The curve 200 illustrates the transmission characteristics of filter 108. Referring to FIG. 1, at point 202 on the curve 200, corresponding to a wavelength of about 400 nm, the filter transmits incident light with a high transmittance of nearly 100%, transmitting nearly all the light incident onto it. This continues until point 204, which may correspond to a wavelength of 472 nm. At point 204 the transmission characteristics start dropping and drop to a minimum at point 206 which may correspond to a wavelength of 490 nm. According to an embodiment, the transmission at point 206 may be 40%. From point 206, the transmittance increases till it reaches a maximum at point 208, which may correspond to a wavelength of 530 nm. From point 208 onwards, the transmission drops gradually until point 210 and then drop quickly till point 212, which may correspond to a wavelength of 675 nm. Consequently the IR filter blocks Infrared light and prevents it from entering the sensor 110. The ranges described include all values in between, for example, 470 nm to 530 nm includes all values and ranges between and including these end points.

It should be noted that the wavelength and transmission ranges and/or values are described herein to help better understand the subject matter. According to some embodiments, the IR cut filter characteristics may be altered or extended without losing the effect sought. For example, the start point 204 and end point 208 of the ripple may be altered depending upon the nature and response of image sensor 110.

According to an embodiment, the ripple in transmission characteristics 202 of IR filter 108 between points 204 and 208 may improve the image sensor 110 response and bring it closer to sRGB. According to an embodiment, using IR filter 108 with transmission characteristics 200 may simplify the design of IR filter design. According to an embodiment, using the IR filter 108 with transmission characteristics 200 may eliminate the need for absorption layers in the in the filter. According to an embodiment, wide angle performance of the camera 102 of a device 100 may be achieved without a complicated IR-filter design. According to an embodiment, ghosting due to IR filter designed for wideband image capture may be eliminated by using IR filter 108. According to an embodiment, the IR filter 108 may be less vulnerable to generating optical artefacts at different angles of incidence of light.

Figure 4:
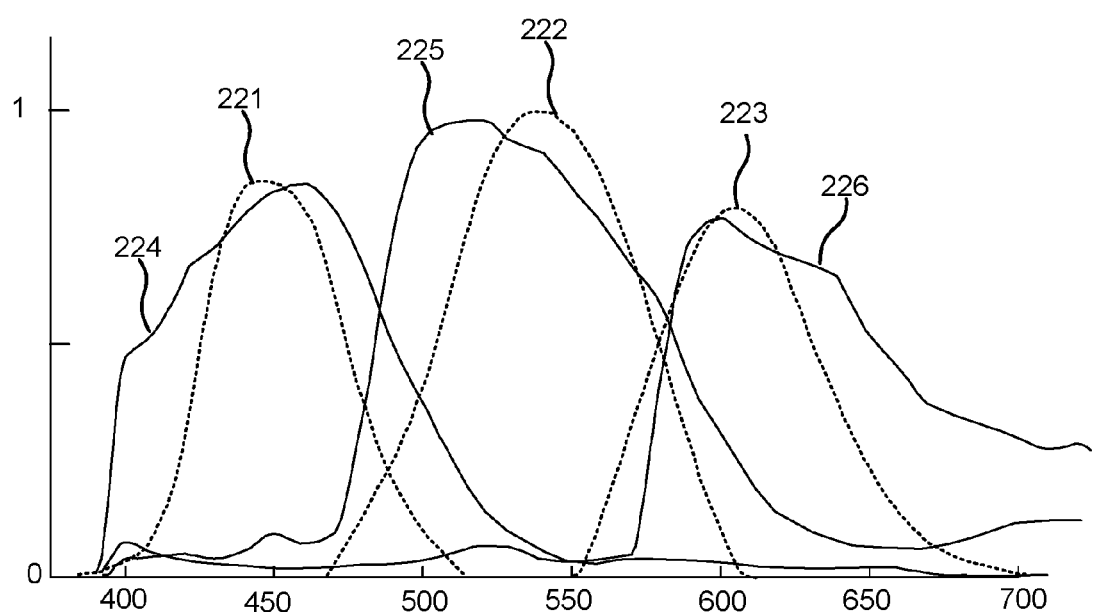
FIG. 4 illustrates a graphical representation of image sensor response compared to standard Red Green Blue, sRGB expected response according to an embodiment.

FIG. 4 illustrates, in a graphical manner, the standard red green blue, sRGB response and spectral response of image sensor 110, according to an embodiment. The horizontal axis represents wavelengths and the vertical axis represents spectral sensitivity. Curve 221 represents the standard blue response, curve 222 represents the standard green response and curve 223 represents the standard red response. Curve 224 represents the image sensor 110 responses for blue, curve 225 represents the image sensor 110 response for green and curve 226 represents the image sensor 110 response for red. The image sensor 110 response to color green 225 may not completely conform to sRGB response 222. The image sensor 110 may capture a substantial amount of spectral power outside the sRGB green response 222 and may appear shifted towards the blue wavelengths.

Figure 5:
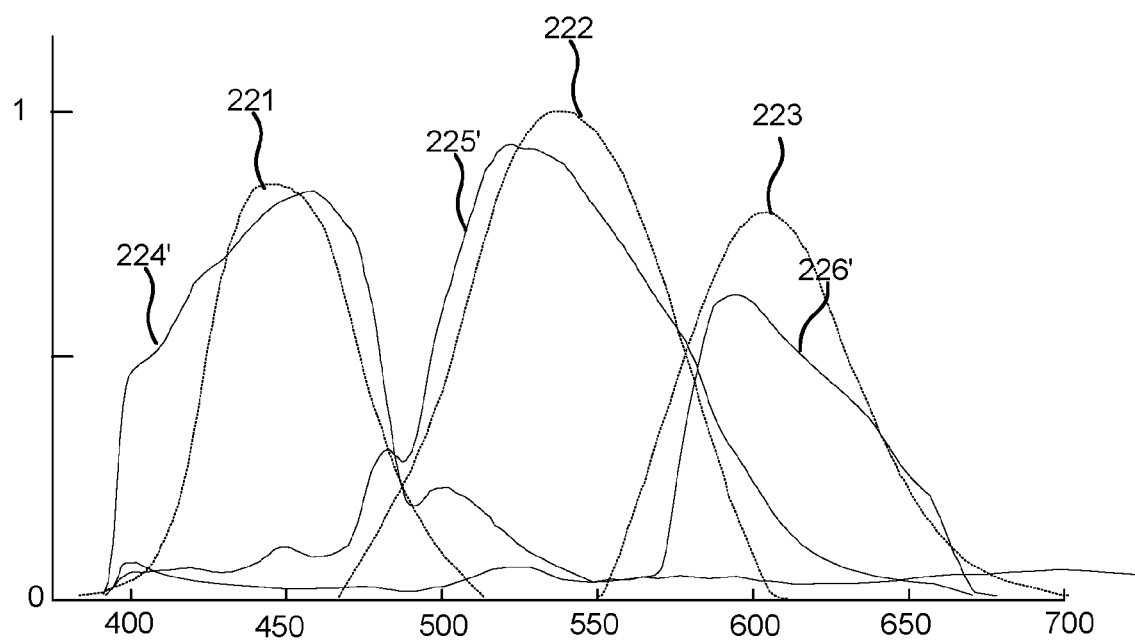
FIG. 5 illustrates a graphical representation of image sensor response, compared to standard Red Green Blue, sRGB expected response, when an IR cut off filter is used according to an embodiment.

FIG. 5 illustrates, in a graphical manner, the sRGB response with respect to the response of image sensor 110, when filter 108 is used, according to an embodiment. The horizontal axis represents wavelengths and the vertical axis represents spectral sensitivity. Curve 221 represents the standard blue response, curve 222 represents the standard green response and curve 223 represents the standard red response. Curve 224' represents the image sensor 110 responses for blue, curve 225' represents the image sensor 110 response for green and curve 226' represents the image sensor 110 response for red, when IR filter 108 is used to filter the light entering image sensor 110. The image sensor 110 response for color green 225' is closer to sRGB green 222. The ripple between points 204 and 208 in transmission characteristics 200 of IR cut filter 108 as illustrated in FIG. 3, cuts away some of the spectral power between blue and green available to image sensor 110. According to an embodiment, the ripple start and end positions 204, 208 and its depth, and hence blocking characteristics, may be adjusted according to the response of image sensor 110. This may be done, for example, by varying the number of interference layers and/or their characteristics. According to an embodiment, better color reproduction may be achieved. According to an embodiment, the ripple between points 204 and 208 in transmission characteristics 200 of IR cut filter 108, as illustrated in FIG. 3, may be directed towards the shorter wavelengths of the color green, cutting away spectral power from shorter wavelengths of green over a broader range of wavelengths. According to an embodiment, this may make response of image sensor 110 to color green 225' conform to the sRGB green 222 to a higher degree.

Figure 6:
FIG. 6 illustrates a schematic representation of a cross-section of a side view of an IR cut-off filter according to an embodiment.

FIG. 6 illustrates a cross-section of an IR filter according to an embodiment. It comprises a blue glass substrate 1080, multiple interference layers 1081 on one surface and multiple AR layers 1082 on another surface. According to an embodiment the number of interference layers 1081 in IR filter may be up to 30 layers. The number of AR layers 1082 may be from 5 to 10. According to an embodiment, reducing the number of interference layers 1081 to 30 or less may simplify design and/or manufacture of IR filter 108. According to an embodiment, lesser interference layers 1081 in IR filter 108 may reduce its costs.

Figure 7:
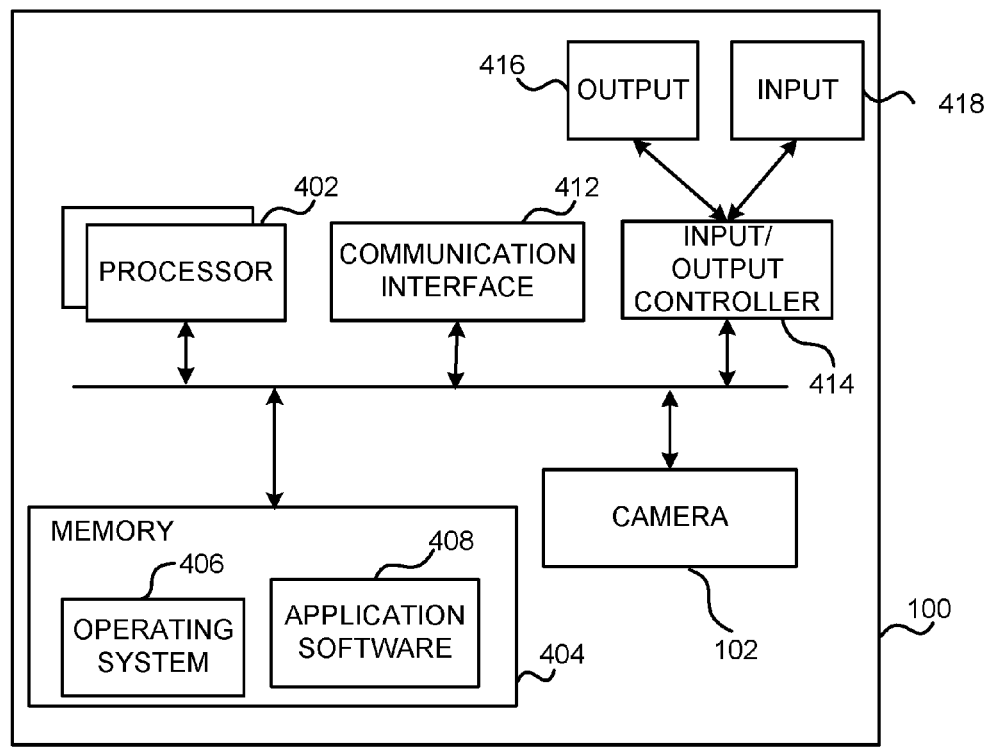
FIG. 7 illustrates a schematic representation of a computing device according to an embodiment.

FIG. 7 illustrates an example of components of a computing device 100 which may be implemented as a form of a computing and/or electronic device. The computing device 100 comprises one or more processors 402 which may be microprocessors, controllers or any other suitable type of processors for processing computer executable instructions to control the operation of the apparatus 100. Platform software comprising an operating system 406 or any other suitable platform software may be provided on the apparatus to enable application software 408 to be executed on the device.

Computer executable instructions may be provided using any computer-readable media that are accessible by the device 100. Computer-readable media may include, for example, computer storage media such as a memory 404 and communications media. Although the computer storage medium (the memory 404) is shown within the device 100, it will be appreciated, by a person skilled in the art, that the storage may be distributed or located remotely and accessed via a network or other communication link (e.g. using a communication interface 412).

The device 100 may comprise an input/output controller 414 arranged to output information to an output device 416 which may be separate from or integral to the device 100. The input/output controller 414 may also be arranged to receive and process an input from one or more input devices 418. In one embodiment, the output device 416 may also act as the input device. The input/output controller 414 may also output data to devices other than the output device, e.g. a locally connected printing device. Further, the device may comprise a camera 102, which may be configured to communicate with processor 402. According to an embodiment, the device for example as shown in FIG. 1, may be established with the features of FIG. 7, for example the operating system 406 and the application software 408 working jointly, and executed by the processor 402 to for example, process the image information captured by camera 102. According to an embodiment, the processing of image information may be carried out by one or more logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 8:
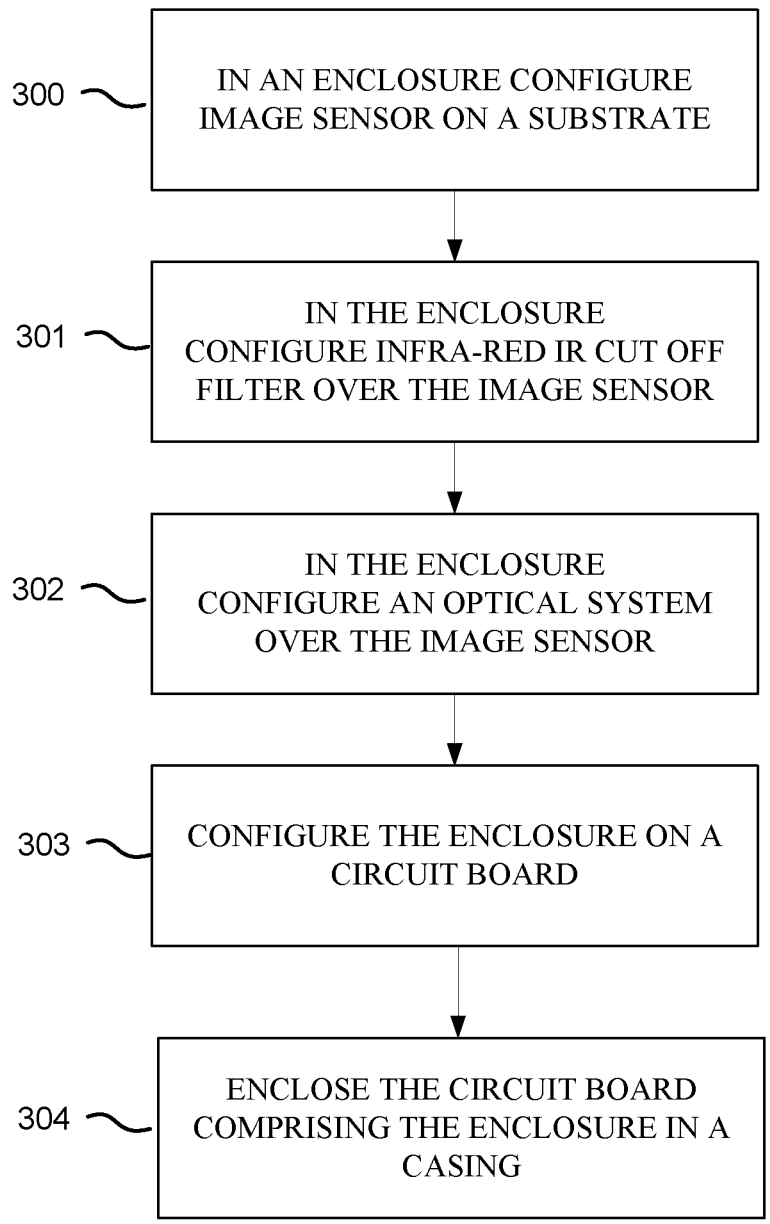
FIG. 8 illustrates a schematic flow chart of a method in accordance with an embodiment.

FIG. 8 illustrates, as a schematic flow chart, a method of manufacture of a device in accordance with an embodiment. Referring to FIG. 8, according to an embodiment the method comprises operations 300, 301, 302, 303, 304.

Operation 300 includes configuring, for example placing or inserting, an image sensor 110 in an enclosure. The enclosure 106 may be a housing for the image sensor 110 and other components comprising a camera module. According to an embodiment, the enclosure 106 may be made of material having anti-reflective properties. According to an embodiment, the enclosure 106 may comprise necessary electronics and connecting the image sensor 110 a device bus. According to an embodiment, the enclosure 106 may be painted black on the inside.

Operation 301 includes configuring an IR cut filter over the image sensor 110. This may be performed by placing or inserting it over the sensor 110. The transmission characteristics of the IR cut off may have a pass band between 400 nm between 675 nm. Within the pass band there is a ripple between colors blue and green with substantially lower transmission. According to an embodiment, the ripple may extend between wavelengths 472 nm to 512 nm. According to an embodiment, the IR cut-off filter may cut-off up to 60% of radiation having wavelength 472 nm to 512 nm. According to an embodiment, the IR cut off filter may comprise up to 30 layers of IR interference layers and up to 10 layers of anti-reflection coating.

Operation 302 includes configuring, for example placing or inserting, an optical system 104 over the IR cut off filter. According to an embodiment, the optical system 104 may comprise at least one lens. According to an embodiment, the optical system 104 may comprise an image stabilization system.

Operation 303 includes configuring, for example placing or inserting, the enclosure 106 from operation 302 comprising the image sensor 110, the IR cut filter, and the optical system 104 on a circuit board comprising at least a processor 402 and a storage 404. The configuration may be so that image sensor 110 and the processor are electronically connected, for example via a bus.

Operation 304 includes enclosing the circuit board from operation 303 in a casing such that there is an optical aperture 103 in the casing corresponding to the enclosure 106 comprising the camera. The optical aperture 103 may be in the form of a transparent window or an aperture in the casing.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The embodiments illustrated and described herein as well as embodiments not specifically described herein but within the scope of aspects of the disclosure constitute exemplary means for converting image information carried in visible light into image information in electronic form, for example pixels and/or bits, exemplary means for processing and/or storing such information, exemplary means for guiding visible light onto an image sensor, exemplary means for filtering non-visible light from a light beam, and exemplary means for providing an electrical and/or data connection between the image sensor and a processor. For example, the elements illustrated in FIG. 1 and FIG. 7 constitute exemplary means for converting image information carried in visible light into image information in electronic form, for example pixels and/or bits, exemplary means for processing and/or storing such information, exemplary means for guiding visible light onto an image sensor, exemplary means for filtering non-visible light from a light beam, and exemplary means for providing an electrical and/or data connection between image sensor and a processor.

According to an embodiment, a device, comprising: an image sensor; an optical system comprising at least one lens; and an infrared, IR cut-off filter; the transmission characteristics of the IR cut-off filter comprising a ripple with a low transmission between wavelengths corresponding to blue and green.

Alternatively or in addition to the above, the transmission characteristics of the IR cut-off filter comprise the ripple with the low transmission in a range chosen between wavelengths 470 nm and 515 nms. Alternatively or in addition to the above, the transmission characteristics of the IR cut-off filter comprises the ripple with a lowest transmission chosen from the range 30% to 40%. Alternatively or in addition to the above, the lowest transmission substantially corresponds to a wavelength range chosen between 487 nm to 491 nm. Alternatively or in addition to the above, the IR cut-off filter comprises a blue glass substrate and multiple IR interference layers on one side and multiple anti-reflective layers on another side. Alternatively or in addition to the above, the IR cut-off filter comprises less than or equal to 30 IR interference layers. Alternatively or in addition to the above, the IR cut-off filter comprises less than or equal to 10 Anti-reflective layers. Alternatively or in addition to the above, the optical system comprises at least three lenses. Alternatively or in addition to the above, the optical system comprises an image stabilization module and/or an autofocus. Alternatively or in addition to the above, the image sensor is a complementary metal-oxide semiconductor, CMOS based sensor.

According to an embodiment, a portable device, comprising: an image sensor; an optical system comprising at least one lens; and an infrared, IR cut-off filter; the response of the image sensor in the green region being wider than standard red green blue, sRGB color space; and transmission characteristics of the IR cut-off filter comprising a ripple with low transmission between wavelengths corresponding to blue and green.

Alternatively or in addition to the above, the transmission characteristics of the IR cut-off filter normalize the response of the image sensor towards sRGB. Alternatively or in addition to the above, the transmission characteristics of the IR cut-off filter comprise the ripple with low transmission in a range chosen between wavelengths 470 nm and 515 nms. Alternatively or in addition to the above, the transmission characteristics of the IR cut-off filter comprises the ripple with a lowest transmission chosen from the range 30% to 40%. Alternatively or in addition to the above, the lowest transmission substantially corresponds to a wavelength range chosen between 487 nm to 491 nm. Alternatively or in addition to the above, the IR cut-off filter comprises a blue glass substrate and at most 30 IR interference layers; or a resin type absorbing layer; or a plastic absorbing substrate. Alternatively or in addition to the above, the IR cut-off filter comprises at most 10 anti-reflective layers. Alternatively or in addition to the above, the optical system comprises an image stabilization module.

According to an embodiment, a method comprising: configuring an image sensor on a substrate, in an enclosure; configuring an infrared IR cut off filter over the image sensor, in the enclosure, transmission characteristics of the IR cut off filter comprising a ripple with substantially lower transmission of in between wavelengths corresponding to colors blue and green; configuring an optical system over the image sensor, in the enclosure; configuring the enclosure on a circuit board comprising at least one processor and storage; and enclosing the circuit board comprising the enclosure in a casing, such that there is an optical aperture in the casing corresponding to the enclosure.

Alternatively or in addition to the above, the ripple extends from 487 nm to 491 nm.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
an image sensor;
an optical system comprising at least one lens; and
an infrared, IR cut-off filter;
the transmission characteristics of the IR cut-off filter comprising a ripple with a low transmission between wavelengths corresponding to blue and green.

2. The device of claim 1 wherein the transmission characteristics of the IR cut-off filter comprise the ripple with the low transmission in a range chosen between wavelengths 470 nm and 515 nms.

3. The device of claim 1, wherein the transmission characteristics of the IR cut-off filter comprises the ripple with a lowest transmission chosen from the range 30% to 40%.

4. The device of claim 3, wherein the lowest transmission substantially corresponds to a wavelength range chosen between 487 nm to 491 nm.

5. The device of claim 1, wherein the IR cut-off filter comprises a blue glass substrate and multiple IR interference layers on one side and multiple anti-reflective layers on another side.

6. The device of claim 5 wherein the IR cut-off filter comprises less than or equal to 30 IR interference layers.

7. The device of claim 5 wherein the IR cut-off filter comprises less than or equal to 10 Anti-reflective layers.

8. The device of claim 1, wherein the optical system comprises at least three lenses.

9. The device of claim 1, wherein the optical system comprises an image stabilization module and/or an autofocus.

10. The device of claim 1, wherein the image sensor is a complementary metal-oxide semiconductor, CMOS based sensor.

11. A portable device, comprising:
an image sensor;
an optical system comprising at least one lens; and
an infrared, IR cut-off filter;
a response of the image sensor in a green region being greater than standard red green blue, sRGB color space; and
transmission characteristics of the IR cut-off filter comprising a ripple with low transmission between wavelengths corresponding to blue and green.

12. The device of claim 11, wherein the transmission characteristics of the IR cut-off filter normalize the response of the image sensor towards sRGB.

13. The device of claim 11 wherein the transmission characteristics of the IR cut-off filter comprise the ripple with low transmission in a range chosen between wavelengths 470 nm and 515 nms.

14. The device of claim 11, wherein the transmission characteristics of the IR cut-off filter comprises the ripple with a lowest transmission chosen from the range 30% to 40%.

15. The device of claim 14, wherein the lowest transmission substantially corresponds to a wavelength range chosen between 487 nm to 491 nm.

16. The device of claim 11, wherein the IR cut-off filter comprises a blue glass substrate and at most 30 IR interference layers; or
a resin type absorbing layer; or
a plastic absorbing substrate.

17. The device of claim 11, wherein the IR cut-off filter comprises at most 10 anti-reflective layers.

18. The device of claim 11, wherein the optical system comprises an image stabilization module.

19. A method comprising:
configuring an image sensor on a substrate, in an enclosure;
configuring an infrared IR cut off filter over the image sensor, in the enclosure, transmission characteristics of the IR cut off filter comprising a ripple with substantially lower transmission of in between wavelengths corresponding to colors blue and green;
configuring an optical system over the image sensor, in the enclosure;
configuring the enclosure on a circuit board comprising at least one processor and storage; and
enclosing the circuit board comprising the enclosure in a casing, such that there is an optical aperture in the casing corresponding to the enclosure.

20. The method according to claim 19, wherein the ripple extends from 487 nm to 491 nm.

* * * * *